US008549620B2

(12) United States Patent
Ueda et al.

(10) Patent No.: US 8,549,620 B2
(45) Date of Patent: *Oct. 1, 2013

(54) INFORMATION PROCESSING DEVICE, DATA PROCESSING METHOD, AND PROGRAM

(75) Inventors: Kenjiro Ueda, Kanagawa (JP); Tateo Oishi, Saitama (JP)

(73) Assignee: Sony Corporation, Tokyo (JP)

( * ) Notice: Subject to any disclaimer, the term of this patent is extended or adjusted under 35 U.S.C. 154(b) by 418 days.

This patent is subject to a terminal disclaimer.

(21) Appl. No.: 12/543,698

(22) Filed: Aug. 19, 2009

(65) Prior Publication Data

US 2010/0050250 A1 Feb. 25, 2010

(30) Foreign Application Priority Data

Aug. 21, 2008 (JP) ................................. 2008-212484

(51) Int. Cl.
*G06F 21/00* (2013.01)

(52) U.S. Cl.
USPC .................. 726/17; 726/18; 726/19; 726/20; 726/21; 726/22; 726/23; 726/24; 726/25; 726/26; 726/27; 726/4; 726/6; 726/9; 726/16; 713/189; 713/190; 713/191; 713/192; 713/193; 713/194; 717/174; 717/175; 717/176; 717/177; 717/178; 717/168; 717/169; 717/170; 717/171; 717/172; 717/173; 705/51; 705/52; 705/53; 705/54

(58) Field of Classification Search
USPC ........................................................... 726/17
See application file for complete search history.

(56) References Cited

U.S. PATENT DOCUMENTS

| 6,950,941 | B1 * | 9/2005 | Lee et al. | 713/193 |
| 2002/0152381 | A1 * | 10/2002 | Kuriya et al. | 713/170 |
| 2003/0196111 | A1 * | 10/2003 | Lampson et al. | 713/200 |
| 2005/0144181 | A1 * | 6/2005 | Kii et al. | 707/100 |
| 2006/0015748 | A1 * | 1/2006 | Goto et al. | 713/190 |
| 2006/0112284 | A1 * | 5/2006 | Kato et al. | 713/193 |
| 2006/0227973 | A1 * | 10/2006 | Takashima et al. | 380/277 |
| 2007/0140078 | A1 * | 6/2007 | Muraki et al. | 369/47.12 |

(Continued)

FOREIGN PATENT DOCUMENTS

| JP | 2004-030326 A | 1/2004 |
| JP | 2005-057435 A | 3/2005 |
| JP | 2007-109080 A | 4/2007 |
| JP | 2008-098765 A | 4/2008 |

OTHER PUBLICATIONS

Espacenet search, Espacenet Result list, Dec. 2011.*

*Primary Examiner* — Andy Rao
*Assistant Examiner* — Shan Elahi
(74) *Attorney, Agent, or Firm* — Sony Corporation

(57) ABSTRACT

An information processing device includes: a local memory unit for storing data including an encrypted content; a memory for storing data including key information used to reproduce the encrypted content; and a data processing unit performing a process of writing data to the local memory unit and the memory, and a process of reproducing the encrypted content, wherein the data processing unit performs a process of writing encrypted content downloaded from a server or encrypted content copied from a medium to the local memory unit, and performs a process of decoding the encrypted content or a validity authenticating process using the data stored in the local memory unit and the data stored in the memory when reproducing the encrypted content written to the local memory unit.

20 Claims, 11 Drawing Sheets

(56) References Cited

U.S. PATENT DOCUMENTS

| | | | |
|---|---|---|---|
| 2007/0162978 A1* | 7/2007 | Watanabe et al. | 726/27 |
| 2008/0066075 A1* | 3/2008 | Nutter et al. | 718/107 |
| 2008/0133701 A1* | 6/2008 | Kazmi et al. | 709/217 |
| 2009/0043681 A1* | 2/2009 | Shoji et al. | 705/35 |
| 2009/0238362 A1* | 9/2009 | Kitani et al. | 380/44 |
| 2009/0293131 A1* | 11/2009 | Pak et al. | 726/26 |
| 2009/0320039 A1* | 12/2009 | Garbow et al. | 718/105 |
| 2011/0131665 A1 | 6/2011 | Ueda et al. | |

\* cited by examiner

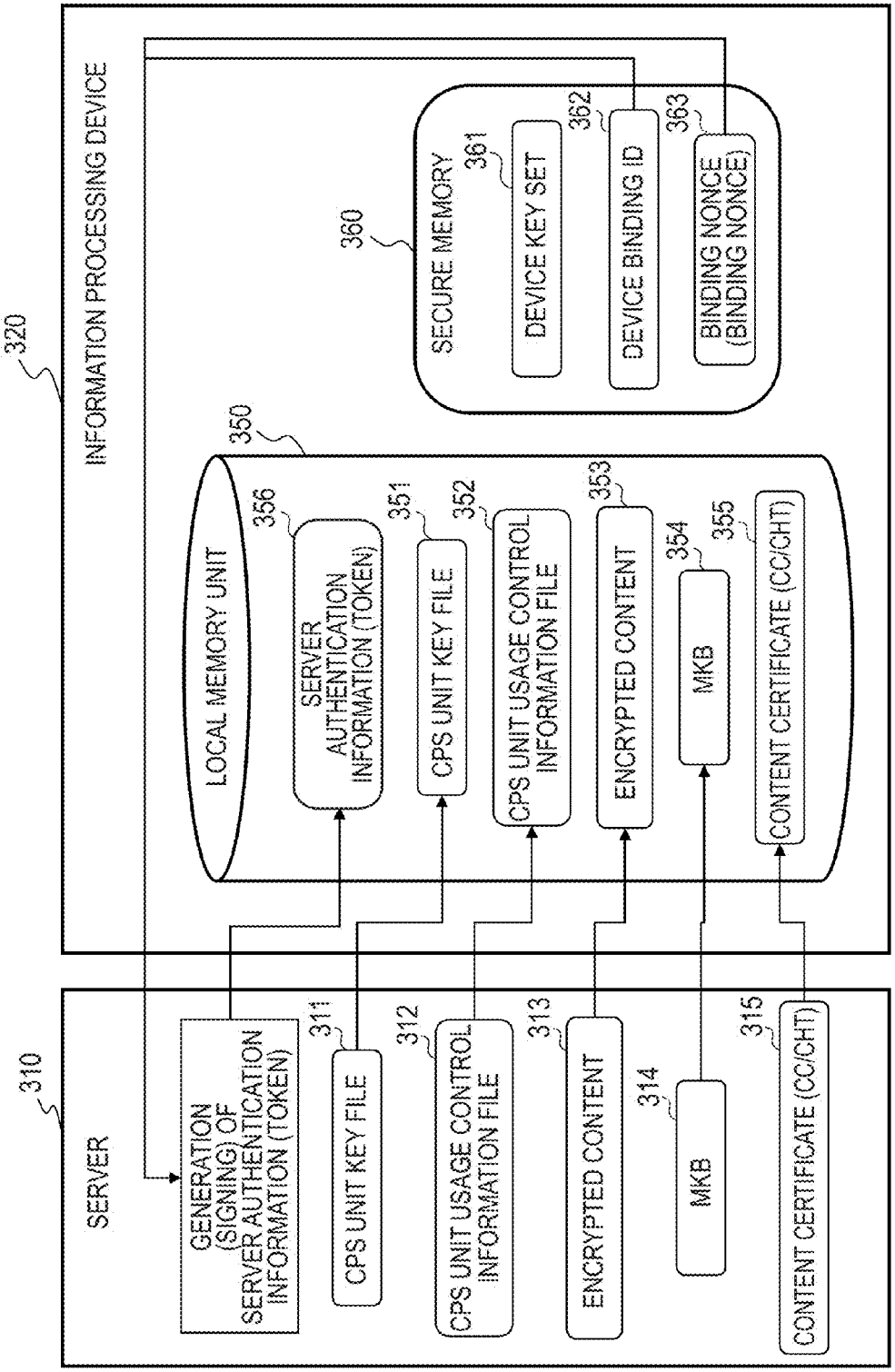

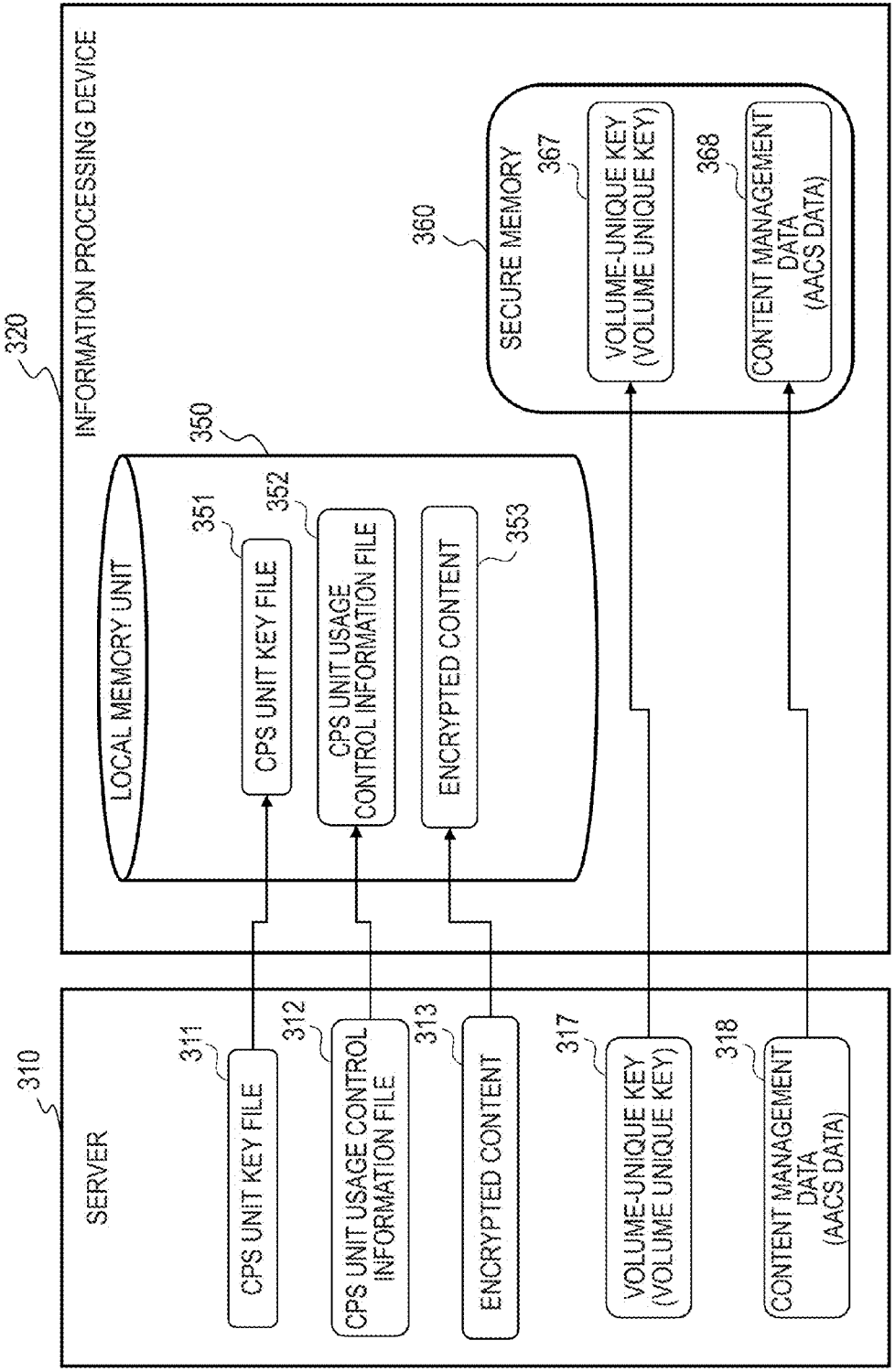

FIG.8

(a) VOLUME-UNIQUE KEY (DATA NOT TO BE REVEALED)

| TITLE NUMBER(16B) | VOLUME UNIQUE KEY(16B) |
|---|---|
| 0x000...001(M1) | 0x1234...7890 (ENCRYPTED) |
| 0x000...002(M2) | 0xABCD...CDEF (ENCRYPTED) |
| 0x800...001(E1) | 0x5678...3456 (ENCRYPTED) |

{ MANAGED COPY WHEN FIRST BIT IS 0, EST WHEN FIRST BIT IS 1, AND OTHER VALUES CORRESPOND TO "xx" OF DIRECTORY NAME "BDPVxx" }

(b) CONTENT MANAGEMENT DATA (AACS DATA) (DATA NOT TO BE FALSIFIED)

| TITLE NUMBER(16B) | VOLUME ID(16B) | PMSN(16B) | ANTI-FALSIFICATION CODE(40B) |
|---|---|---|---|
| 0x000...001(M1) | 0x2345...6789 | 0x5678...90AB | 0x890A...BCDE |
| 0x000...002(M2) | 0x3456...7890 | 0x6789...0ABC | 0x90AB...CDEF |
| 0x800...001(E1) | 0x4567...890A | 0x7890...ABCD | 0xABC...DEF0 |

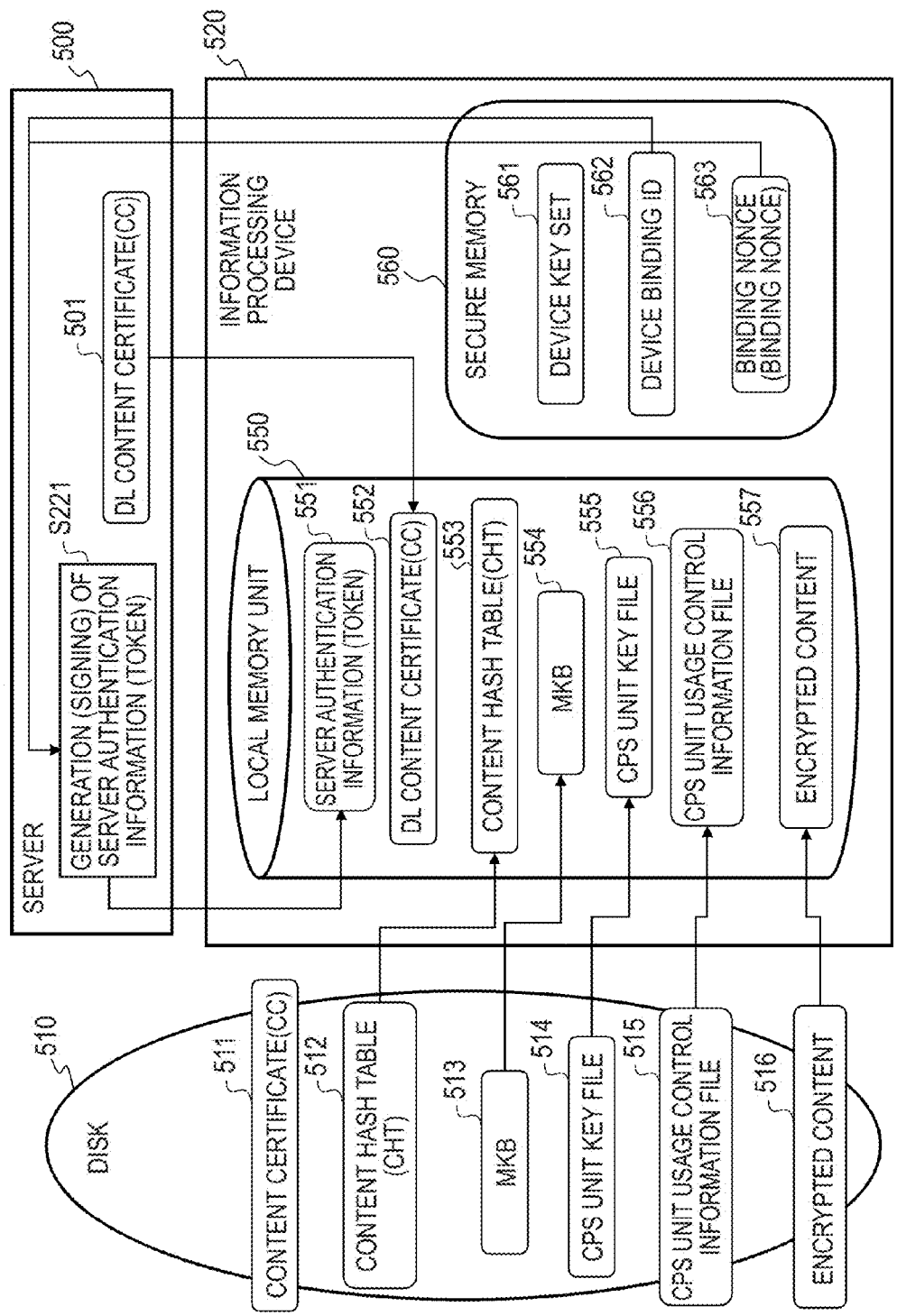

INFORMATION PROCESSING DEVICE, DATA PROCESSING METHOD, AND PROGRAM

BACKGROUND OF THE INVENTION

1. Field of the Invention

The invention relates to an information processing device, a data processing method, and a program, and more particularly, to an information processing device, a data processing method, and a program, which are configured to perform a content writing process or a content copying process on a recording medium.

2. Description of Related Art

DVD (Digital Versatile Disc), Blu-ray Disc (registered trademark), and the like are often used as recording mediums for various content such as music and movies. These information recording mediums having data recorded thereon include mediums (ROM type) not permitting the writing of new data thereto and mediums (R type, RE type, and the like) permitting the writing of data thereto. By using the data-writable information recording mediums, it is possible to copy or move content recorded in other mediums. For example, it is also possible to download and record content, for example, through a network or by the use of devices installed in public locations.

In addition to the DVD and the Blu-ray Disc (registered trademark), hard disks and flash memories are used as the recording mediums on which content is recorded.

Examples of a process type of recording content on a recording medium include the followings:

(a) a process of copying (or moving) content from a medium (for example, a ROM disk) having the content recorded thereon to another medium;

(b) a process of downloading and recording content from a server; and (c) a process of recording content by the use of a terminal located in a public space such as a front of a store.

However, the copyright, the distribution right, and the like of various types of content such as music data and image data are possessed by the authors or sellers thereof. Therefore, when content is provided to users, predetermined usage restriction is generally taken, that is, the usage of the content is permitted to only a user having the regular right of usage and unauthorized copying is not permitted.

For example, AACS (Advanced Access Content System) is known as a standard for usage restriction of content. In the AACS standard, when a content is copied between the mediums like (a), this copy process is based on the premise that copy permission information should be acquired from a management server. That is, the copy process is permitted under predetermined management. This copy process is called managed copy (MC).

The content providing process of (b), that is, the download type content providing process, is called EST (Electric Sell Through). The content providing process of (c) using public terminals is called MoD (Manufacturing on Demand) The AACS standard requires these processes to be performed in accordance with a predetermined rule.

The following three processes will be described in brief with reference to FIGS. 1 and 2:

(a) Managed Copy (MC);

(b) EST (Electric Sell Through); and (c) MoD (Manufacturing on Demand).

(a) Managed Copy (MC)

For example, as shown in (a) of FIG. 1, the managed copy (MC) is a process of allowing a user 1 to set an information recording medium (disk) 3 having a content recorded thereon to an information processing device 2 performing a data recording and reproducing process and copying the content read from the information recording medium (disk) 3 to, for example, a data-writable R/RE type disk such as an R type or RE type or a second information recording medium 4 such as a hard disk or a flash memory.

At the time of performing this content copying process, it is necessary that the data recording and reproducing device 2 accesses a management server 5 via a network 6 and obtains the permission to content copy from the management server 5.

A configuration for performing the content copying process between plural mediums by the use of a single information processing device, that is, only one device, is shown in FIG. 1, but two devices of a device having a medium as a copy source attached thereto and another device having a medium as a copy destination attached thereto may be connected to each other with, for example, a USB cable or the like.

(b) EST (Electric Sell Through)

The process of downloading content from a server and recording the content on an information recording medium is called EST (Electric Sell Through). As shown in (b) of FIG. 2, the EST is a process of fitting a user's medium, for example, a data-writable R or RE type disk 12, into an information processing device 13 such as a PC possessed by the user 11 and receiving and recording a content from a content server (EST server) 14 through a network 15.

(c) MoD (Manufacturing on Demand)

The content providing process using a public terminal is called MoD (Manufacturing on Demand). As shown in (c) of FIG. 2, the MoD is performed when a user 21 intends to record content on a medium using a content server 24 as a terminal installed in public spaces such as convenience stores or stations. The MoD is a process of allowing the user 21 to set the user's data-writable medium such as an R or RE type disk 22 into the content server (MoD server) 24 as the terminal of a convenience store 23 and recording desired content on the disk 22 according to the operation by the user 21 such as selection of content.

The processes of (a) to (c) are described, for example, in JP-A-2008-98765.

In this way, users can record content on data-writable mediums and utilize (reproduce and the like) the recorded content. However, for example, when the content is to be protected by copyright, it is necessary to control the usage of content to prevent unauthorized usage.

As described above, the AACS (Advanced Access Content System) is known as a standard for the content copyright protection techniques. In the AACS standard, usage control information (usage rule) corresponding to content is defined and the content is used in accordance with the usage control information (usage rule). In addition, strict usage control is realized by dividing content into units, preparing encrypted content using unit keys corresponding to the units, and allowing only a specific user to acquire the unit keys.

When the disk having content recorded thereon is a medium such as a ROM type disk permitting only reproduction and not permitting the writing of new data, additional writing or editing of new content is not performed on the medium. Therefore, it is possible to provide users with the content-specific control information (usage rule) or unit keys corresponding to the content recorded on the medium in a state where the usage rule or unit keys are recorded on the medium.

However, in an example where content is recorded on a data-writable R or RE type medium such as a disk, a hard disk, and a flash memory and used, the content recorded on the medium is not fixed but can be subjected to the data updates such as the recording of new content or the deleting of recorded content. The usage rule or the unit keys need to be updated with content stored in the medium.

In this way, when a user records content on a medium, it is necessary to perform various complex processes such as recording various accessory data corresponding to the recorded content, as well as recording the content.

Particularly, the key information and the like needs to be prevented from leaking, and various ID information and content management data are data that is not to be falsified. When the leakage of the key information or various ID information and the content management data is falsified, the possibility of non-permitted usage of contents increases.

SUMMARY OF THE INVENTION

It is desirable to provide an information processing device, a data processing method, and a program, which are configured to safely write and use data such as key data or ID information that is not to be leaked or falsified when storing content downloaded from a server or content copied from another medium in a local memory unit.

According to a first embodiment of the invention, there is provided an information processing device including: a local memory unit storing data including encrypted content; a memory storing data including key information used to reproduce the encrypted content; and a data processing unit performing a process of writing data to the local memory unit and the memory, and a process of reproducing the encrypted content. Here, the data processing unit performs a process of writing encrypted content downloaded from a server or encrypted content copied from a medium to the local memory unit, and performs a process of decoding the encrypted content or a validity authenticating process using the data stored in the local memory unit and the data stored in the memory when reproducing the encrypted content written to the local memory unit.

In the information processing device according to the embodiment of the invention, the data processing unit may transmit the information processing device-specific data stored in the memory to the server, receive server authentication information in which the transmitted data is signed with a secret key of the server, and store the received server authentication information in the local memory unit.

In the information processing device according to the embodiment of the invention, the data processing unit may perform a process of acquiring key information using a device-specific device key set stored in the memory on a key block stored in the local memory unit when reproducing the encrypted content written to the local memory unit.

In the information processing device according to the embodiment of the invention, the data processing unit may perform a process of downloading content from the server as well as performing a process of acquiring a volume-unique key correlated with the downloaded content and content management data and storing the acquired data in the memory.

In the information processing device according to the embodiment of the invention, the data processing unit may store the volume-unique key in the memory as data corresponding to a title of the content.

In the information processing device according to the embodiment of the invention, the data processing unit may store the content management data in the memory as data corresponding to a title of the content, a volume ID correlated with the content, a medium ID specific to a content-storing disk, and a falsification verification code.

In the information processing device according to the embodiment of the invention, the data processing unit may perform a process of reading a volume ID correlated with the content stored in the medium and a medium ID specific to a content-storing disk and writing the data to the memory when performing the process of copying and writing the encrypted content stored in the medium to the local memory unit.

In the information processing device according to the embodiment of the invention, the data processing unit may perform a process of acquiring key information using a device key set, which is stored in the memory, specific to the information processing device on a key block stored in the medium and perform a process of writing the acquired key information to the memory, when performing the process of copying and writing the encrypted content stored in the medium to the local memory unit.

In the information processing device according to the embodiment of the invention, the data processing unit may perform a process of transmitting information processing device-specific data stored in the memory to the server, receiving server authentication information in which the transmitted data is signed with a secret key of the server, and storing the received server authentication information in the local memory unit and perform a process of acquiring a content certificate for authenticating the validity of the copied content from the server and storing the acquired content certificate in the local memory unit, when performing the process of copying and writing the encrypted content stored in the medium to the local memory unit.

According to a second embodiment of the invention, there is provided a data processing method performed by an information processing device, including the steps of: allowing a data processing unit to perform a process of writing encrypted content downloaded from a server or encrypted content copied from a medium to a local memory unit; and allowing the data processing unit to perform a process of transmitting information processing device-specific data stored in memory other than the local memory unit to the server, receiving server authentication information in which the transmitted data is signed with a secret key of the server, and storing the received server authentication information in the local memory unit.

According to a third embodiment of the invention, there is provided a program for processing data in an information processing device, including: allowing a data processing unit to perform a process of writing encrypted content downloaded from a server or encrypted content copied from a medium to a local memory unit; and allowing the data processing unit to perform a process of transmitting information processing device-specific data stored in memory other than the local memory unit to the server, receiving server authentication information in which the transmitted data is signed with a secret key of the server, and storing the received server authentication information in the local memory unit.

The program according to the embodiment of the invention is a computer program which can be provided to a general-purpose computer system executing various program codes by a recording medium or a communication medium in a computer-readable manner. By providing the program in the computer-readable manner, processes corresponding to the program are carried out by the computer system.

Other advantages, features, and effects of the invention will become apparent by the following detailed description based on specific embodiments of the invention or the accompanying drawings. A system referred to in this specification means a logical set of plural devices and is not limited to a configuration in which the devices are disposed in the same chassis.

According to the above-mentioned embodiments of the invention, in the configuration for storing content downloaded from a server or content copied from a medium in a local memory unit, it is possible to safely store key data with high secrecy in memory other than the local memory unit. Accordingly, for example, even when data stored in the local memory unit is copied and leaks out, it is possible to prevent the non-permitted usage of the contents by preventing the data stored in the memory from being leaked out. In addition, the device-specific ID information and the like stored in the memory is transmitted to the server and the server authentication data is received and stored in the local memory unit. Accordingly, the correlation of the content stored in the local memory unit with the device is reliably carried out.

BRIEF DESCRIPTION OF THE DRAWINGS

FIG. 6 is a sequence diagram illustrating a process sequence of the content downloading process.

FIG. 7 is a sequence diagram illustrating a process sequence of the inter-medium content copying process.

FIG. 8 shows diagrams illustrating flowcharts of the process sequence of the inter-medium content copying process.

FIG. 11 is a diagram illustrating details of data movement and recording processes performed in the inter-medium content copying process.

DESCRIPTION OF PREFERRED EMBODIMENTS

Hereinafter, an information processing device, a data processing method, and a program according to an embodiment of the invention will be described in detail with reference to the drawings.

First, a process example of the managed copy (MC) performed by an information processing device according to an embodiment of the invention will be described with reference to FIG. 3. As described above, the managed copy (MC) is a process of copying content to another medium on the condition that copy permission information is received from a management server.

Figure 3:
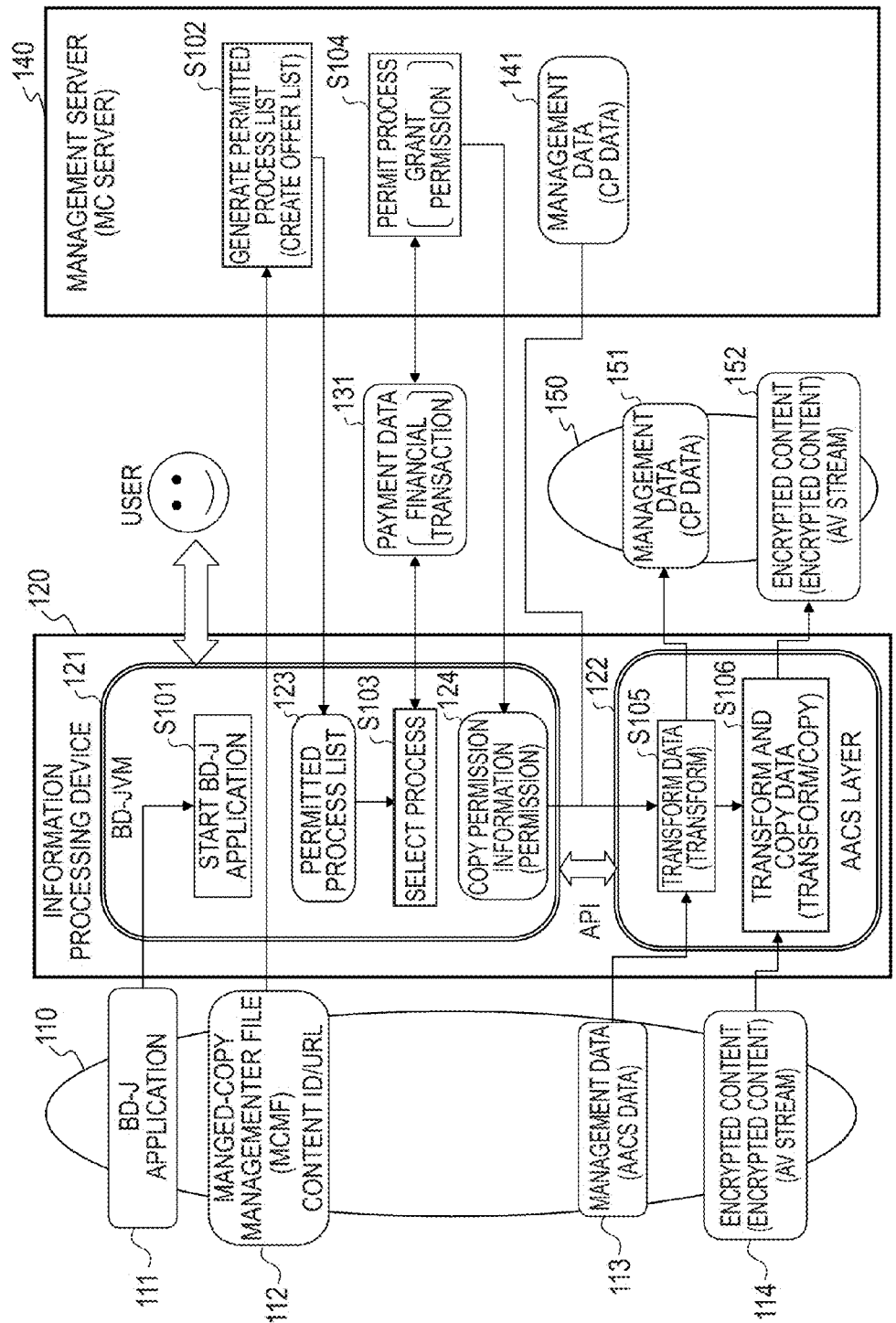
FIG. 3 is a diagram illustrating a specific process example of the MC (managed copy) which is a process of copying content between information recording mediums and is performed under predetermined control.

In FIG. 3, a disk 110 having content recorded thereon, an information processing device 120 reading the content from the disk 110 and recording the read content to a data-writable second recording medium 150, a data-writable second recording medium 150 which is the copy destination of the content, and a management server 140 providing permission information for the content copying process or management data are shown from the left side.

The disk 110 is, for example, a ROM disk, and is a disk 110 such as Blu-ray Disc (registered trademark).

The data-writable second recording medium 150 as the copy destination of the content is a recording medium such as a hard disk, a R/RE disk, and a flash memory.

The information processing device 120 is constructed, for example, by a PC, a recording and reproducing device, or the like and has a function of reading data from the disk 110 and writing the read data to the second recording medium 150.

As shown in the drawing, a BD-J application 111 which is a Java (registered trademark) application program, a managed-copy management file (MCMF) 112, management data 113, and an encrypted content 114 are recorded in the disk 110.

The BD-J application 111 is a program which is executed by the information processing device 120 at the time of performing a managed copy (MC) process and is used to perform, for example, a process of communication with the management server 140. The BD-J application 111 may be constructed by a single application program or a combination of plural BD-J applications performing specific processes.

For example, the plural BD-J applications can include a BD-J application making a communication with a server and a BD-J application performing a charging process. At the time of copying content, the plural BD-J applications are executed by the information processing device 120.

The managed-copy management file (MCMF) 112 is a file used to perform a content copying process and is an XML-described data file including the following information:

(a) a content ID which is an identifier (ID) uniquely representing content recorded in the information recording medium (disk 110);

(b) URI (URL) which is information for accessing a management server giving permission to copy at the time of copying content and generating a token by a binding process, for example, information for accessing the management server 140; and (c) directory name and file name which are information on names of a directory and a file in which data for permitting a copy process is recorded.

The management data 113 is management data defined by an AACS (Advanced Access Content System) which is a standard management system for content copyright protecting techniques and includes a CPS unit key file including keys (unit keys) used to decode the encrypted content 114, usage control information, a content certificate (CC) representing the validity of the content, and an MKB (Media Key Block) which is an encryption key block including key information (medium key) for acquiring the CPS unit keys.

The encrypted content 114 is an encrypted content according to, for example, the AACS standard. For example, the encrypted content includes an AV (Audio Visual) stream of moving image content such as HD (High Definition) movie content which is high-definition moving image data, music data, a game program, an image file, voice data, or text data.

The encrypted content 114 is configured to control usage by, for example, content management units (CPS units) and is an encrypted content to which different unit keys (CPS unit keys) are applied by the content management units (CPS units). Different keys (CPS unit keys) are assigned to the units, respectively, are encrypted, and are stored.

Two data processing units are set in the information processing device 120.

The first data processing unit is a BD-JVM (BD-J virtual machine) 121. The BD-JVM 121 is set as a virtual machine which is a virtual hardware environment for executing the BD-J application 111 recorded in the disk 110.

The second data processing unit is an AACS layer 122. The AACS layer 122 is set as a data processing unit for performing a data process according to the AACS standard, such as a process of acquiring an ID recorded in the disk 110, treatment of information with high security, and data transformation in a content copying process.

In this way, when a process of copying content recorded in the disk 110 to another medium is performed, the BD-JVM 121 as an execution area of the BD-J application 111 recorded in the disk 110 and the AACS layer 122 as an execution area of a program for performing the processes according to the AACS standard are established to transmit and receive process requests and process results therebetween.

In order to transmit and receive process requests and process results between the BD-J application and the AACS layer, an API (Application Programming Interface) is used. The API is a set of functions for performing various processes necessary for the content copying process. The API is recorded in the BD-J application 111 or other areas which can be read by the information processing device 120. A specific example of the API will be described in detail later.

The information processing device 120 executes the BD-J application 111 in the BD-JVM 121, communicates with the management server 140, and performs the process of acquiring the copy permission information 132 and the like.

When the content 114 stored in the disk 110 is copied to a second recording medium 150, it is necessary to transform the content or the usage control information (usage rule) depending on the medium as a copy destination. This process is performed in the program executing area (AACS layer 122) for performing the processes according to the AACS standard.

The BD-J application 111 is a program for executing processes necessary for the content copying process and is executed in the BD-JVM 121 of the information processing device 120. The following processes are performed as the processes employing the BD-J application:

(a) a server accessing process using the URI of a managed-copy management file (MCMF);
(b) a process of acquiring a permitted process list from a server;
(c) a process of transmitting the user's process selection information to the server;
(d) a payment process;
(e) a process of acquiring copy permission information from the server, a check process, a process of outputting the copy permission information to a recording controller;
(f) a process of monitoring the content copying process, which is performed by the recording controller; and
(g) a process of monitoring a process of writing data downloaded from the server, which is performed by the recording controller.

As described above, the BD-J application 111 may be constructed by a single application program, but may also be constructed by a combination of plural BD-J applications performing specific processes. For example, the processes of (a) to (g) may be performed by plural BD-J applications.

The process of the BD-J application will be described now with reference to FIG. 3. The BD-J application is started in the BD-JVM 121 established in the information processing device 120, in step S101 shown in FIG. 3.

At the time of performing the process, a guide picture as a user interface such as a menu provided from the BD-J application is displayed on the display of the information processing device 120. A series of processes for performing the content copying process (managed copy) is started by a user's instruction.

The BD-J application first accesses the management server 140 using the server URI included in the managed-copy management file (MCMF) 112 in accordance with the user's instruction. At this time, a content ID corresponding to the content to be copied is transmitted to the management server 140.

In step S102, the management server 140 generates a permitted process list which is list data of processes permitted for the content and transmits the generated permitted process list to the information processing device 120, on the basis of the content ID received from the information processing device 120. For example, the permitted process list is a list including information on whether the copying of the content is permitted and information on the fee of the copy process.

The information processing device 120 receives the permitted process list 123 from the management server 140 and displays the permitted process list on the display in step S103 so as to allow a user to select a process to be performed.

When the user selects a process to be performed, the information processing device 120 performs a payment process by transmitting payment data 131 to the management server 140. For example, the user inputs the data necessary for the payment such as a credit card number to the payment picture and transmits the payment data. Then, in step S104, the management server 140 permits the process and transmits the copy permission information to the information processing device 120.

The information processing device 120 sends the copy permission information 124 received from the management server 140 to the AACS layer 122. The AACS layer 122 performs the process of step S105 and the processes subsequent thereto. The AACS layer 122 performs a process of transforming the management data 113 read from the disk 110 into management data based on the medium type of the second recording medium 150 such as a hard disk, an R/RE disk, and a flash memory as a copy destination. For example, a process of adding an encryption key (unit key) corresponding to the copied content or a process of transforming the usage control information, the content certificate, and the like to data corresponding to the copied content. The information necessary for transforming the data is included in the copy permission information 124. The transformed management data 151 is recorded in the second recording medium 150.

In step S106, the information processing device 120 reads the encrypted content 114 recorded in the disk 110 and outputs content copy data having been subjected to a data transformation such as a format transformation. In this way, the copied data of the content recorded in the disk 110 is recorded as the encrypted content 152 in the second recording medium 150. The management data 151 recorded in the second recording medium 150 includes the usage control information, the content certificate, the MKB, the CPS unit key file, and the token corresponding to the content recorded in the second recording medium 150.

At the time of performing the content copying process, the information processing device 120 and the management server 140 may perform a process of confirming the medium identifier (serial number) of the second recording medium 150 and a process of signing the medium identifier with a secret key of the management server 140 to generate a token. This token may be included in the management data. The management data including the token and the like is indicated by the management data 141 in the management server 140 in FIG. 3. The management data (CP data) 151 recorded in the second recording medium 150 may include the token information.

This content copying process has been roughly described with reference to FIG. 3. As described above, the content copying process is performed using the BD-J application and the program executed in the AACS layer. Therefore, the necessary information needs to be transmitted and received between the BD-J application and the program executed in the AACS layer. The API which defines various processes is employed in this process.

Figure 4:
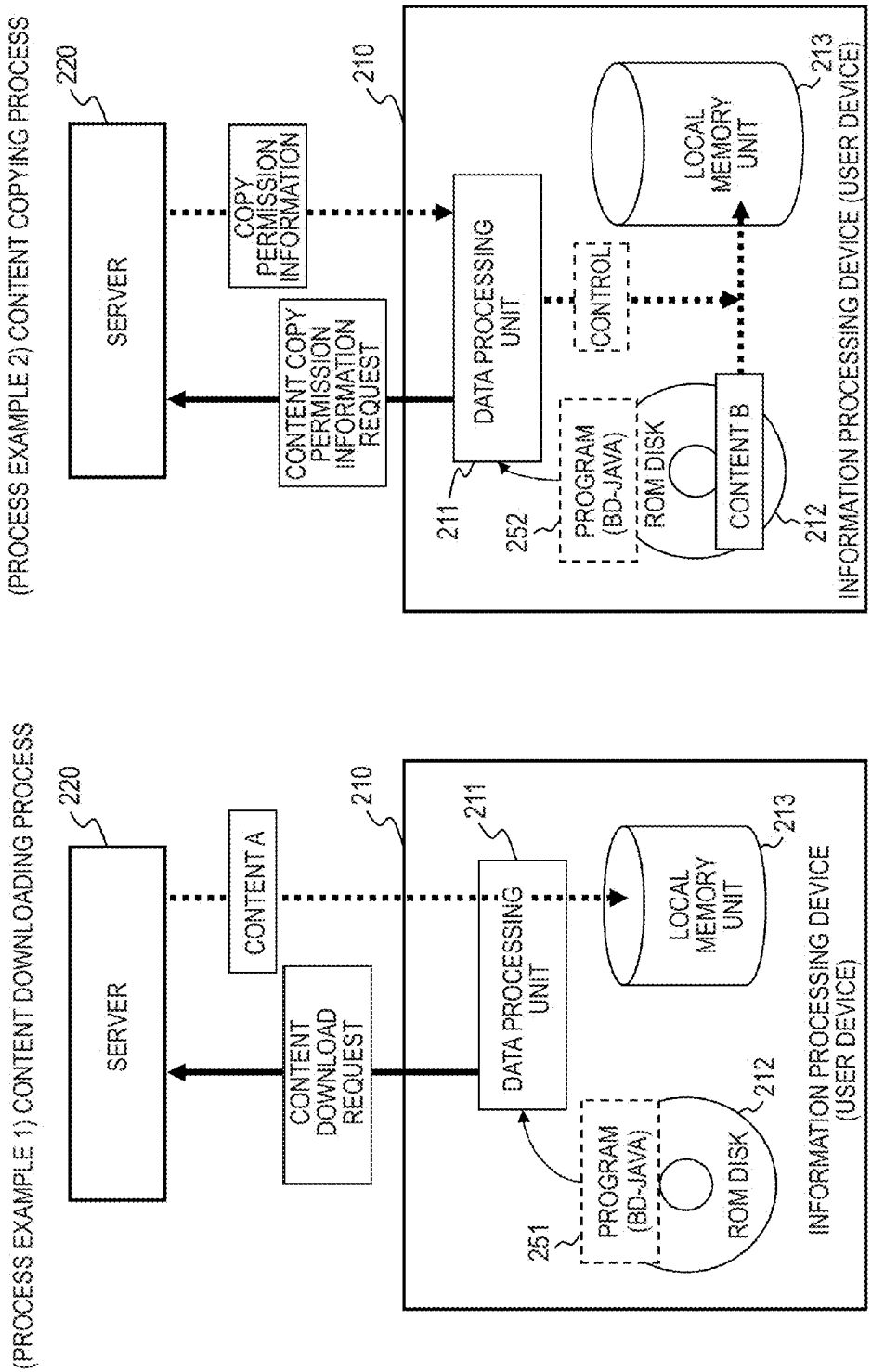
FIG. 4 is a diagram illustrating process examples of the content downloading process and the inter-medium content copying process.

Plural process examples, which are performed by the information processing device according to the embodiment of the invention, using a server, will be described now with reference to FIG. 4. The following two processes are shown in FIG. 4:

Process Example 1: a process of allowing the information processing device (user device) 210 to download content A from the server 220 and to store the downloaded content in the local memory unit 213; and Process Example 2: a process of copying content B stored in the disk 212 to the local memory unit 213.

Figure 2:
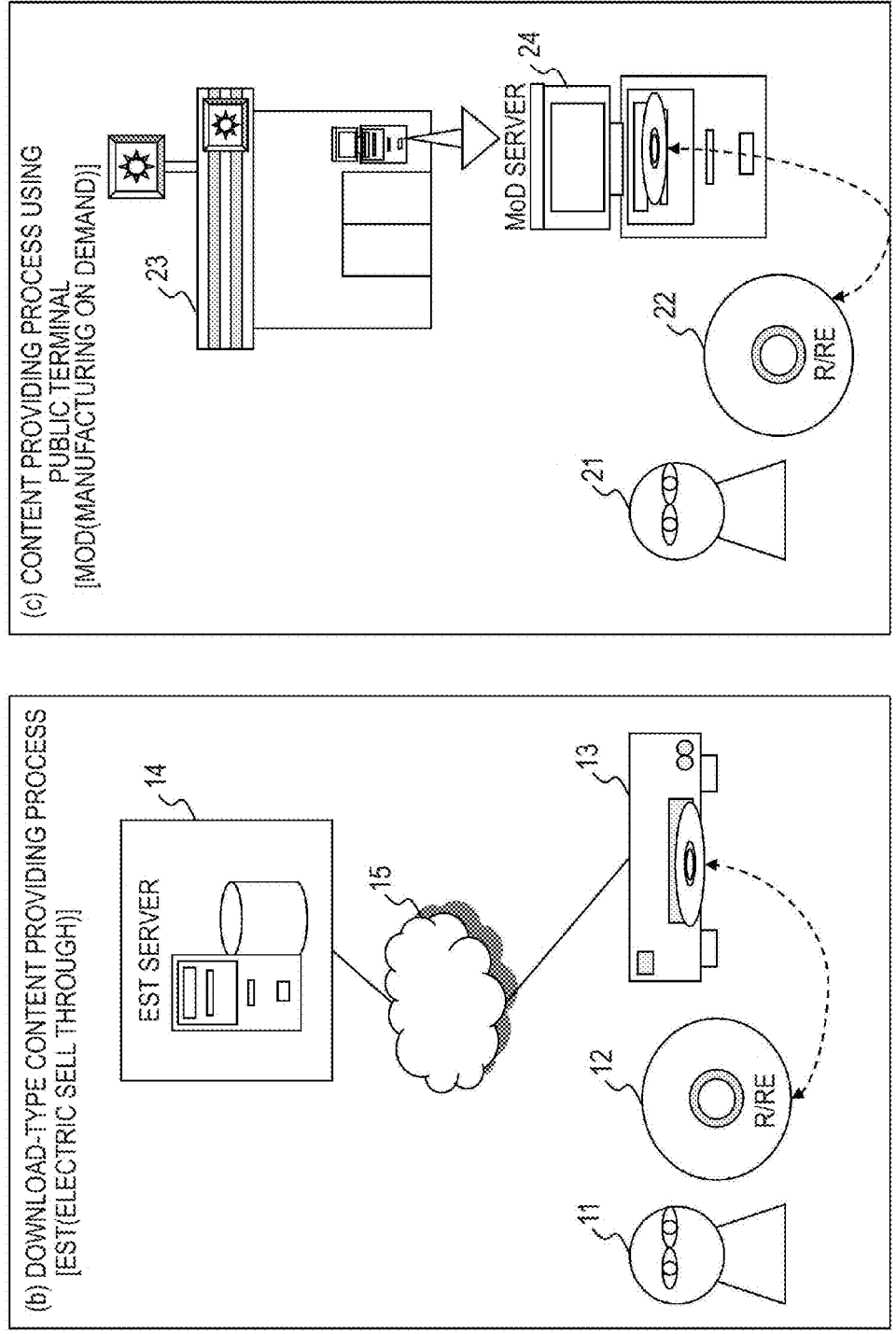
FIG. 2 is a diagram illustrating EST which is a process of downloading content from a server and MoD which is a process of providing content using a public terminal.

Process Example 1 corresponds to the content downloading process corresponding to the EST (Electric Sell Through) described with reference to (b) of FIG. 2.

Figure 1:
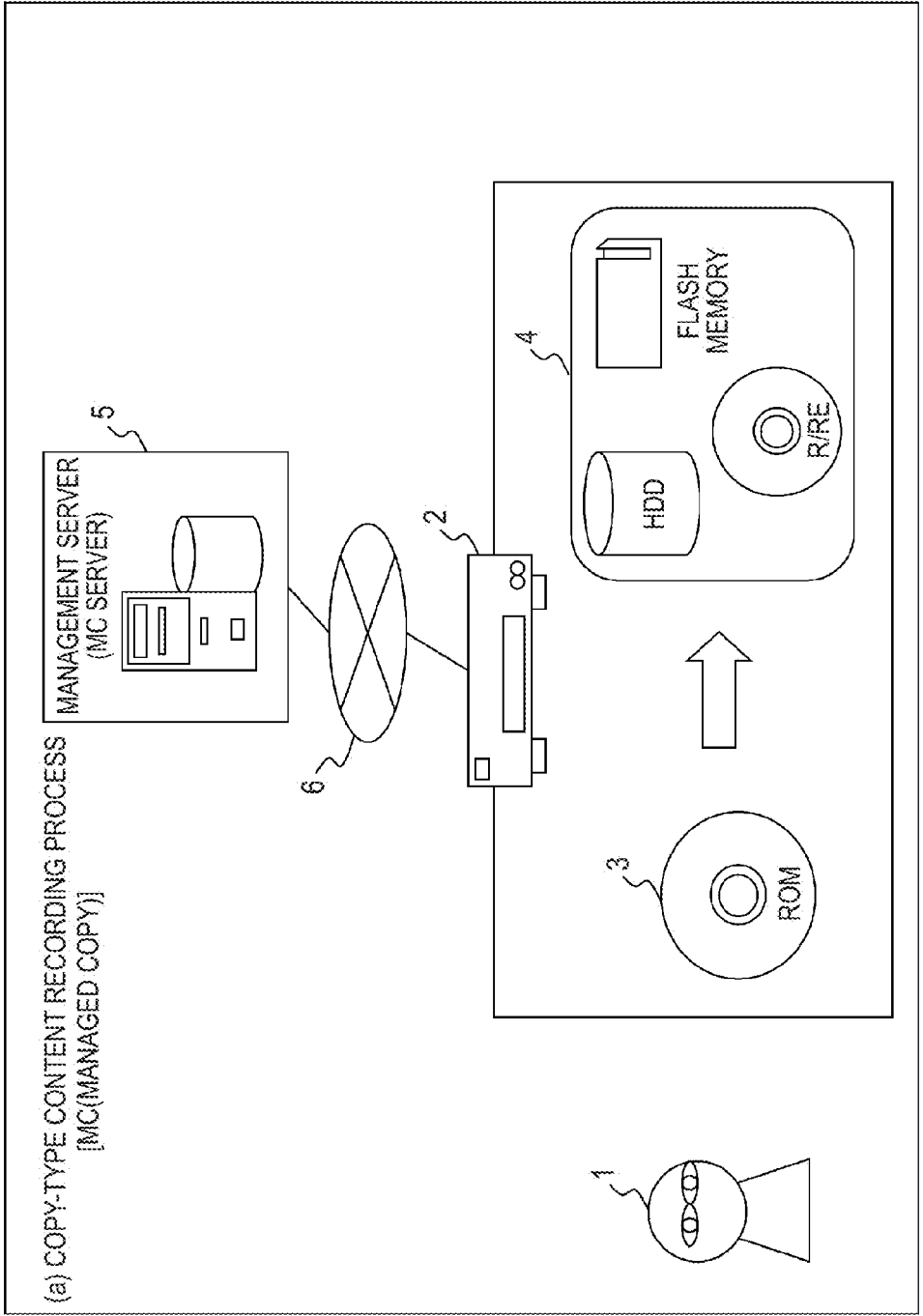
FIG. 1 is a diagram illustrating an example of MC (managed copy) which is a process of copying content between information recording mediums and is performed under predetermined control.

Process Example 2 corresponds to the MC (Managed Copy) described with reference to FIG. 1 and is a process of acquiring copy permission information from the server 220 and copying content between mediums.

Process Example 1 will be roughly described now.

The ROM disk 212 having content such as a movie recorded thereon is first mounted on the information processing device 210. A program 251 recorded in the ROM disk 212 is then executed by the data processing unit 211 to perform a download process of acquiring content A from the server 220. The program 251 is a BD-J application program which is a Java (registered trademark) program corresponding to the BD standard, when the ROM disk 212 is the Blu-ray Disc (registered trademark).

The data processing unit 211 transmits a content download request to the server 220 in accordance with the program 251. The server 220 provides content A to the information processing device 210 in response to the request. The data processing unit 211 of the information processing device 210 stores content A downloaded from the server 220 in a local memory unit 213 in the device, for example, the local memory unit 213 constituted by a hard disk or the like.

At the time of downloading the content from the server 220, the following process may be performed concurrently. That is, the information processing device 210 transmits the ID (device binding ID) of the information processing device or a random number (binding nonce) to the server 220. The server signs the data with a secret key of the server to generate server authentication information (token) and provides the server authentication information to the information processing device 210.

When the downloaded content is used by the information processing device 210, the server authentication information (token) is verified to confirm that the acquired server authentication information (token) is valid. Only when this confirmation is made, the decoding and reproducing of the downloaded content is permitted. By this setting, the usage of the downloaded content is permitted to only a specific device (information processing device).

Process Example 2 shown in FIG. 4 will be described now. This process is a process of copying content B stored in the disk 212 to the local memory unit 213. Content B is content stored in the ROM disk 212 and is content to be subjected to usage control. Therefore, at the time of performing the copy process, it is necessary to acquire the copy permission information from the server 220.

The program for performing this serial copy process is a program (for example, BD-J application) 252 stored, for example, in the ROM disk 212. The program 252 is different from the program 251 recorded in the ROM disk 212 in Process Example 1 shown in FIG. 4. The program 251 is a program for performing the content downloading process and the program 252 is a program for performing the content copying process. The different programs may be stored in the ROM disk 212.

At the time of performing the copy process on the condition that the copy permission information is acquired from the server 220, that is, the managed copy (MC) process, the data processing unit 211 of the information processing device 210 reads and executes the program (BD-J) 252 from the ROM disk 212. The data processing unit 211 performs a series of processes such as a process of reading a medium ID recorded in the ROM disk 212, a process of transmitting the medium ID to the server 220, and a process of acquiring the copy permission information from the server 220 in accordance with the program 252. After these processes are performed, the process of copying the content recorded in the ROM disk 212 to the local memory unit 213 is performed.

In this way, various content such as the content downloaded from the server and the copied content from the ROM disk, that is, the content copied in the managed copy (MC) process performed under the control of the server by acquiring the copy permission information from the server, is recorded in the local memory unit 213.

Figure 5:
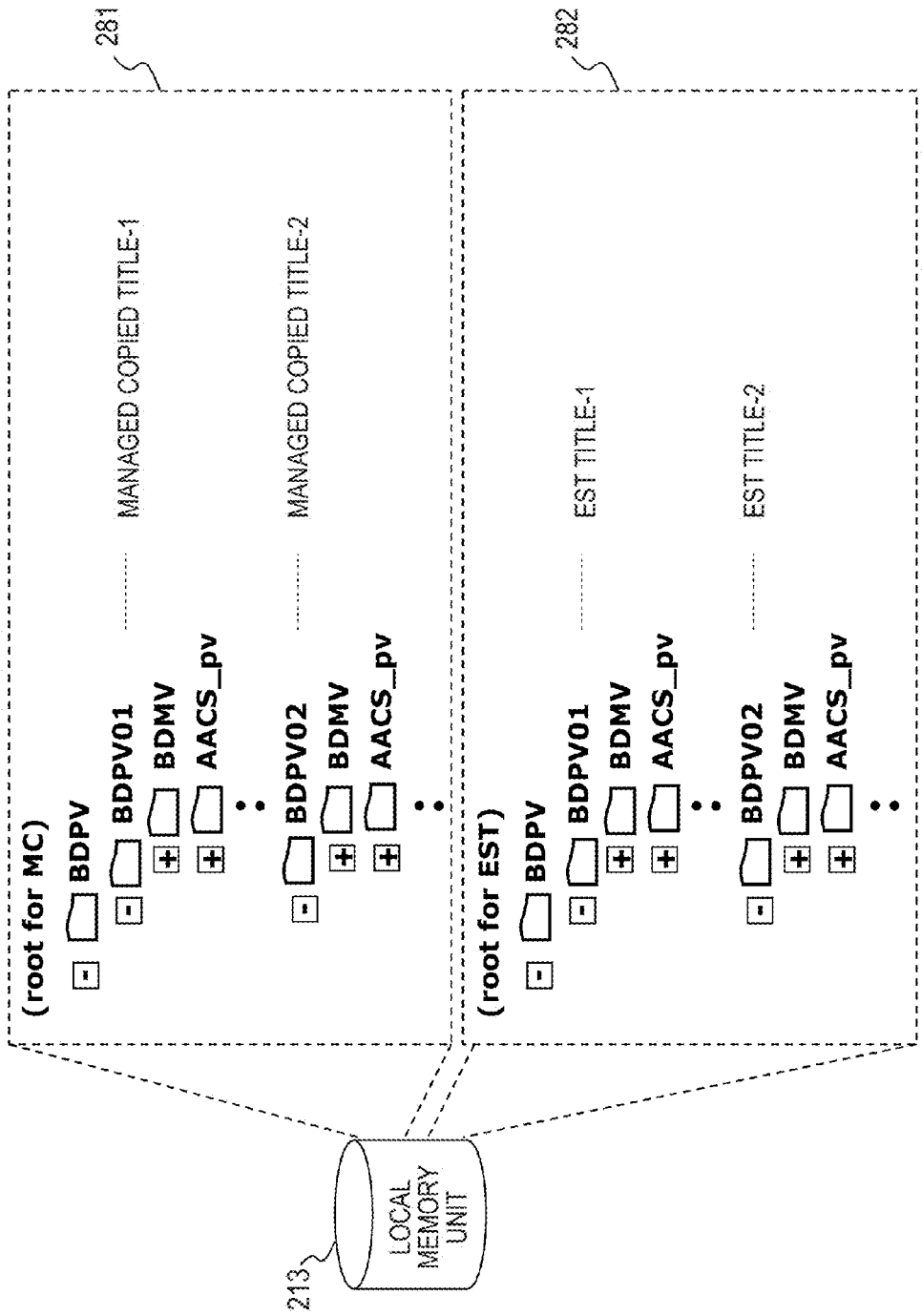
FIG. 5 is a diagram illustrating a directory configuration of a local memory unit in an information processing device.

FIG. 5 shows a configuration of a directory of the local memory unit in which various content is recorded. As shown in FIG. 5, a copied content (MC content) directory 281 for storing content copied from other mediums by the managed copy or the management data and a downloaded content (EST content) directory 282 for storing the content acquired in the download process from the server or its management data are established, for example, in the local memory unit 213 constituted by a hard disk.

The copied content and the downloaded content are divided into the units of titles and are stored in the directories 281 and 282. By this division and setting in the units of titles, data can be selected and copied at the time of performing the copy process on another medium.

However, it is not preferable that the process of reproducing the content recorded in the local memory unit can only be performed using the data recorded in the local memory unit. It is preferable that it should be necessary to use data recorded in an internal memory of the information processing device other than the local memory unit. This is because the data recorded in the local memory unit such as a hard disk can be copied to another medium and non-permitted usage of the content could be encouraged when the content can be reproduced using only the copied data.

An example of data stored in the local memory unit and the memory in the information processing device will be described with reference to FIG. 6 and the subsequent drawings. Plural examples of data storage will be described now in two patterns of (A) an example of data storage where the content downloaded from the server is stored in the local memory unit (see FIGS. 6 to 8) and (B) an example of data storage where the content copied from another medium is stored in the local memory unit (see FIGS. 9 to 11).

The data processing unit of the information processing device performs a process of recording the encrypted content downloaded from the server or the encrypted content copied from the medium in the local memory unit. The data processing unit makes a data communication with the server, which is performed along with the recording process, or performs a key block process such as the MKB. The data processing unit performs a content reproducing process accompanied with the process of decoding the encrypted content or the process of confirming the validity by using the data stored in the local memory unit and the data stored in the secure memory at the time of performing a process of reproducing the encrypted content recorded in the local memory unit.

The example (A) of data storage where the content downloaded from the server is stored in the local memory unit will be first described with reference to FIGS. 6 to 8.

FIG. 6 shows a server 310 providing download content and an information processing device 320 having a local memory unit 350 storing the download content. The information processing device 320 further includes a secure memory 360 as an internal memory. The secure memory 360 is a memory in which the reading or the changing of the stored data is permitted in only a predetermined sequence.

In the example shown in FIG. 6, a device key set 361, a device binding ID 362, and a binding nonce 363 are stored in the secure memory 360.

The device key set 361 is a key set established to correspond to the information processing device 320 as a device. That is, the device key set is a key set specific to an information processing device as a device or set of plural information processing devices. This device key set 361 is used to generate a decoding key at the time of decoding the encrypted content 353 stored in the local memory unit 350. This device key set 361 needs to be managed in a secrecy required system.

The device binding ID 362 is an identifier specific to the information processing device as a device or a set of plural information processing devices. The binding nonce 363 is random number information and is generated and stored in the secure memory 360 by the information processing device 320, for example, at the time of downloading the content from the server 310.

The device binding ID 362 and the binding nonce 363 are data that must be transmitted to the server in order to acquire the server authentication information (token) 356 from the server 310 at the time of downloading the content from the server 310. The device binding ID 362 and the binding nonce 363 need to be managed in a system with anti-falsification (integrity required).

In this example, three pieces of data of the device key set 361, the device binding ID 362, and the binding nonce 363 are stored in the secure memory 360 other than the local memory unit 350. The device key set 361 or the device binding ID 362 may be stored at the time of manufacturing the information processing device 320, or may be acquired and stored from a server or a medium providing the data. When the data is acquired from the server or the medium, it is necessary to have high security to prevent leakage.

When requesting the downloading of content from the server 310, the information processing device 320 transmits the device binding ID 362 and the binding nonce 363 stored in the secure memory 360 to the server 310.

The server 310 generates the server authentication information (token) by signing the data with the secret key and transmits the server authentication information to the information processing device 320. The information processing device 320 stores the server authentication information (token) in the local memory unit 350. The server authentication information (token) 356 in the local memory unit 350 is shown in FIG. 6.

As shown in the drawing, the server 310 transmits a CPS unit key file 311, a CPS unit usage control information file 312, an encrypted content 313, an MKB 314, and a content certificate 315 to the information processing device 320 at the time of downloading the content.

The CPS unit key file 311 is a file storing key used to decode the CPS units of the encrypted content 313 or a key used to generate the keys.

The CPS unit usage control information file 312 is a file storing usage control information of the CPS units of the encrypted content 313.

The encrypted content 313 is an entity of the content to be reproduced and is divided into units (CPS units) as a usage unit.

The MKB 314 is data including key information used to generate a decoding key of the encrypted content 313.

The content certificate 315 is used to confirm the validity of the encrypted content 313. The information processing device 320 confirms the validity of the encrypted content 313 using the content certificate 315 at the time of reproducing the encrypted content 313. By this process, the reproduction of the content is permitted on condition that the validity of the encrypted content 313 is confirmed.

The information processing device 320 stores the data transmitted from the server 310 in the local memory unit 350. That is, the following data is stored in the local memory unit 350 shown in FIG. 6: a CPS unit key file 351, a CPS unit usage control information file 352, an encrypted content 353, an MKB 354, and a content certificate 355. The server authentication information (token) 356 is recorded in addition to these data.

At the time of reproducing the encrypted content 353, the process including the process of confirming the validity of the encrypted content 353 and the process of decoding the encrypted content is performed using all the data stored in the local memory unit and the device key set 361 stored in the secure memory 360.

In this example, the data stored in the secure memory 360 includes the following data: a device key set 361 used to generate a key for decoding the encrypted content; and a device binding ID 362 and a binding nonce 363 used to acquire authentication information from the server, which are stored in the secure memory.

Another example of data where the content downloaded from the server is stored in the local memory unit and the device key set is not necessary will be described now with reference to FIG. 7.

In FIG. 7, a server 310 providing download content and an information processing device 320 including a local memory unit 350 storing the download content and a secure memory 360 are shown.

In the example shown in FIG. 7, a volume-unique key 367 and content management data (AACS data) 368 are stored in the secure memory 360. These data are provided from the server 310. That is, in the example shown in FIG. 6, the information processing device 320 needs to store the device key set 361 and the device binding ID 362 in the secure memory 360 in advance, but the storage of the data is not required in the example shown in FIG. 7. The information processing device 320 can receive the volume-unique key 367 and the content management data (AACS data) 368 from the server 310 and store the received data in the secure memory 360, at the time of downloading the content from the server 310.

Specific data of the volume-unique key 367 and the content management data (AACS data) 368 will be described with reference to FIG. 8.

The volume-unique key is set as a unique key in the title unit of the downloaded content or the copied content. This key is key information used to decode the encrypted content of the corresponding title. The volume-unique key is also encrypted and is decoded for use.

In (a) in FIG. 8, an example of data in which the volume-unique key is correlated with the title number is shown. The correlated data is stored in the secure memory 360. At the time of reproducing the content, the title is designated, the content correlated with the designated title is selected, and the volume-unique key is selectively used depending on the title.

When the download content is acquired from the server, a disk storing one type of content is fitted into the information processing device and the download process is performed, for example, using a program read from the disk. The volume-unique key or the volume ID is a volume-unique key or a volume ID set to correspond to the content title of the disk. When content is copied from the disk and recorded in the local memory unit, the volume-unique key or the volume ID corresponding to the content title of the disk storing the content is recorded as storage data of the secure memory. In (a) in FIG. 8, an example where volume-unique keys corresponding to the titles of various disks are registered is shown.

In an setting example of title numbers, the copy content (MC content) is set when the first bit is 0, the download content (EST content) is set when the first beat is 1, and the directory names or sub-directory names of the local memory unit storing the content are set in the second bit and the subsequent bits. The correspondence between the title numbers and the content becomes clear by this setting.

As shown in (b) in FIG. 8, the content management data (AACS data) 368 includes a title number, a volume ID, a PMSN (Prerecorded Media Serial Number), and an anti-falsification code.

The title number is a title of the download content or the copy content.

The volume ID is an identifier of a title unit.

The PMSN (Prerecorded Media Serial Number) is an ID specific to the medium (disk) and is an ID set in the ROM disk storing the content. The PMSN corresponds to the ID of the ROM disk used to download the content or the ID of the ROM disk as a copy source when the content is copied.

The anti-falsification code is data for verifying the falsification of the title number, the volume ID, and the PMSN.

In this process example, the volume-unique key 367 and the content management data (AACS data) 368 are stored in the secure memory 360 shown in FIG. 7. The volume-unique key 367 needs to be managed in a system requiring secrecy. The content management data (AACS data) 368 needs to be managed in a system with anti-falsification (integrity required).

The volume-unique key 367 and the content management data (AACS data) 368 are both data used to reproduce the encrypted content 353 stored in the local memory unit 350. These data include data necessary for generating a key used to decode the encrypted content 353 or for performing the validity confirming process. When the data included in the content management data (AACS data) 368 is used, it should be necessarily confirmed that no falsification is made therein using falsified verifying data. The data can be used after the absence of falsification is confirmed.

When the information processing device 320 requests the download content from the server 310, the server 310 transmits, as data to be stored in the local memory unit 350 of the information processing device 320, the CPS unit key file 311, the CPS unit usage control information file 312, and the encrypted content 313, as shown in the drawing.

The server 310 transmits the volume-unique key 317 and the content management data (AACS data) 318 as data to be stored in the secure memory 360 of the information processing device 320.

The CPS unit key file 311 is a file storing key used to decode the CPS units of the encrypted content 313 or a key used to generate the keys.

The CPS unit usage control information file 312 is a file storing usage control information of the CPS units of the encrypted content 313.

The encrypted content 313 is an entity of the content to be reproduced and is divided into units (CPS units) as a usage unit.

In this process example, the MKB and the content certificate stored in the local memory unit in the process example having been described with reference to FIG. 6 are not included in the data provided from the server. In this example, the data need not be stored in the local memory unit.

The information processing device 320 stores the data transmitted from the server 310 in the local memory unit 350 or the secure memory 360. That is, the following data are stored in the local memory unit 350 shown in FIG. 7: a CPS unit key file 351, a CPS unit usage control information file 352, and an encrypted content 353. A volume-unique key 367 and a content management data (AACS data) 368 are stored in the secure memory 360.

At the time of reproducing the encrypted content 353, processes using all the data stored in the local memory unit and the data stored in the secure memory are performed.

In the process example shown in FIG. 7, the data necessary for the process of reproducing the encrypted content 353 acquired by download is provided from the server 310. In the configuration having been described with reference to FIG. 6, only a specific information processing device storing the device key set in advance can use the download content. However, in the configuration shown in FIG. 7, any device can use the download content, not just the device having the specific data.

(B) The example of data storage where the content copied from another medium is stored in the local memory unit will be described now with reference to FIGS. 9 to 11.

Figure 9:
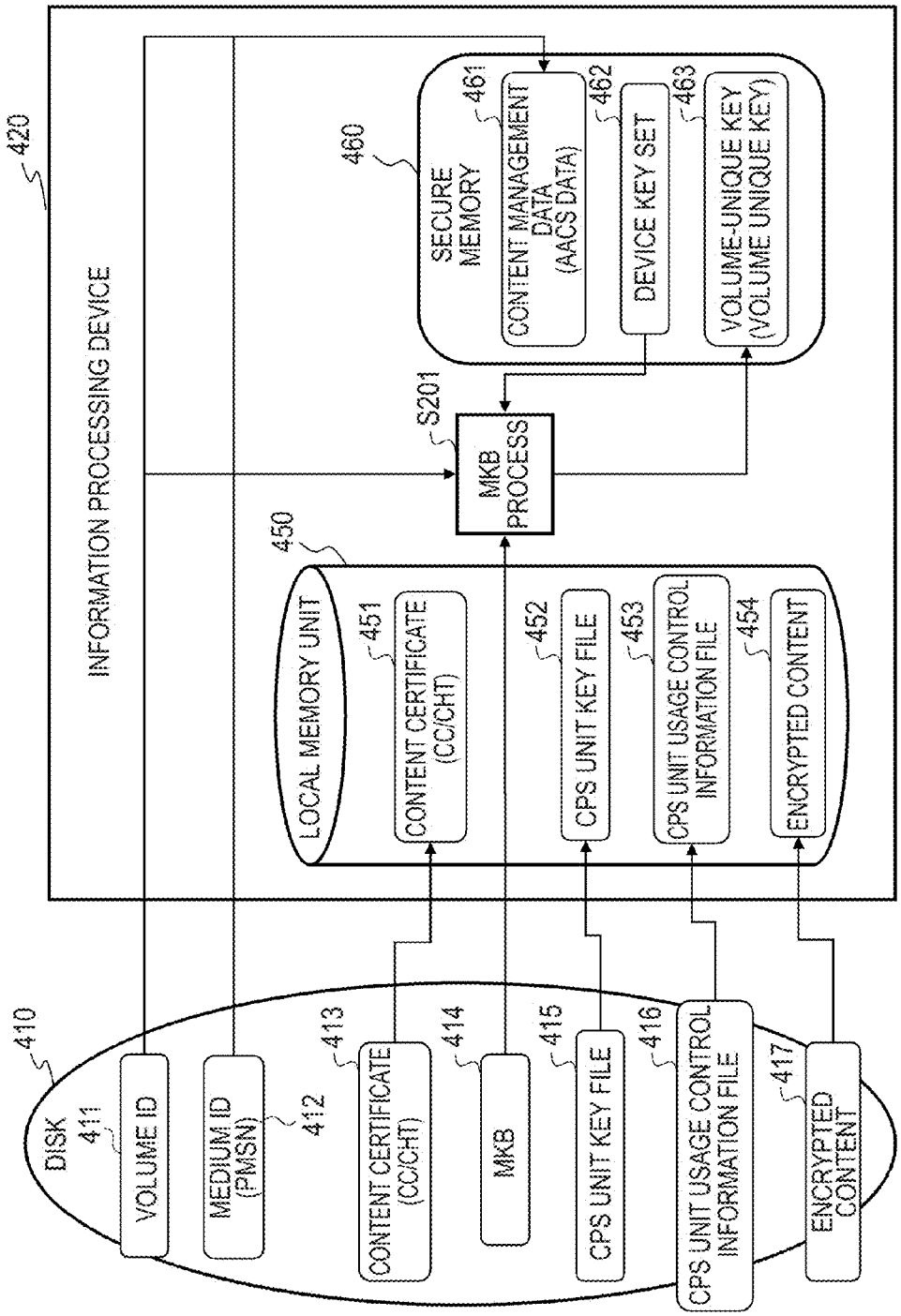
FIG. 9 is a diagram illustrating a specific process sequence and a process configuration of the inter-medium content copying process.

In FIG. 9, a disk 410 storing an encrypted content 417 to be copied and an information processing device 420 including a local memory unit 450 in which the encrypted content 417 of the disk 410 is copied and stored are shown. The information processing device 420 includes a secure memory 460 as an internal memory.

In the example shown in FIG. 9, content management data (AACS data) 461, a device key set 462, and a volume-unique key 463 are stored in the secure memory 460.

The content management data (AACS data) 461 is the same content management data as described with reference to FIG. 8. As shown in (b) in FIG. 8, the title number, the volume ID, the PMSN (Prerecorded Media Serial Number), and the anti-falsification code are set therein as corresponding data.

As the content management data (AACS data) 461, the volume ID 411 and the medium ID (PMSN) 412 stored in the disk 410 storing the encrypted content 417 to be copied are read and stored in the secure memory 460 by the information processing device 420.

The device key set 462 is recorded in the information processing device 420 in advance. Alternatively, the device key set may be acquired from a server or a medium providing the device key set. However, when the device key set is acquired from the server or the medium, it is necessary to secure the security thereof and to prevent the leakage thereof.

The volume-unique key 463 is generated by a data process using the medium key acquired from the volume ID 411 stored in the disk 410 and the MKB 414 stored in the disk 410. As shown in the drawing, the information processing device 420 performs the MKB process in step S201 to generate the volume-unique key 463 and stores the generated volume-unique key in the secure memory 460.

The content management data (AACS data) 461 stored in the secure memory 460 needs to be managed in a system with anti-falsification (integrity required). Both the device key set 462 and the volume-unique key 463 need to be managed in a system requiring secrecy.

When the information processing device 420 copies the content from the disk 410, the following data recorded in the disk 410 are read and recorded in the local memory unit 450 of the information processing device 420: a content certificate 413, a CPS unit key file 415, a CPS unit usage control information file 416, and an encrypted content 417.

A content certificate 451, a CPS unit key file 452, a CPS unit usage control information file 453, and an encrypted content 454 are stored in the local memory unit 450 shown in FIG. 9.

The information processing device 420 reads the volume ID 411 and the medium ID (PMSN) 412 from the disk 410, generates the content management data (AACS data) 461 (see (b) in FIG. 8) including the read data, and stores the generated content management data in the secure memory 460.

In step S201, the information processing device 420 reads the MKB 414 from the disk 410 and acquires the medium key from the MKB 414 using the device key of the device key set 462 read from the secure memory 460. The information processing device generates the volume-unique key 463 by a data process (encryption process) using the acquired medium key and the volume ID 411 read from the disk and stores the generated volume-unique key in the secure memory 460.

At the time of reproducing the encrypted content 454 stored in the local memory unit 450, the processes accompanied with the process of confirming the validity of the encrypted content 454 or the decoding process using the data stored in the local memory unit and the secure memory 460 are performed.

Figure 10:
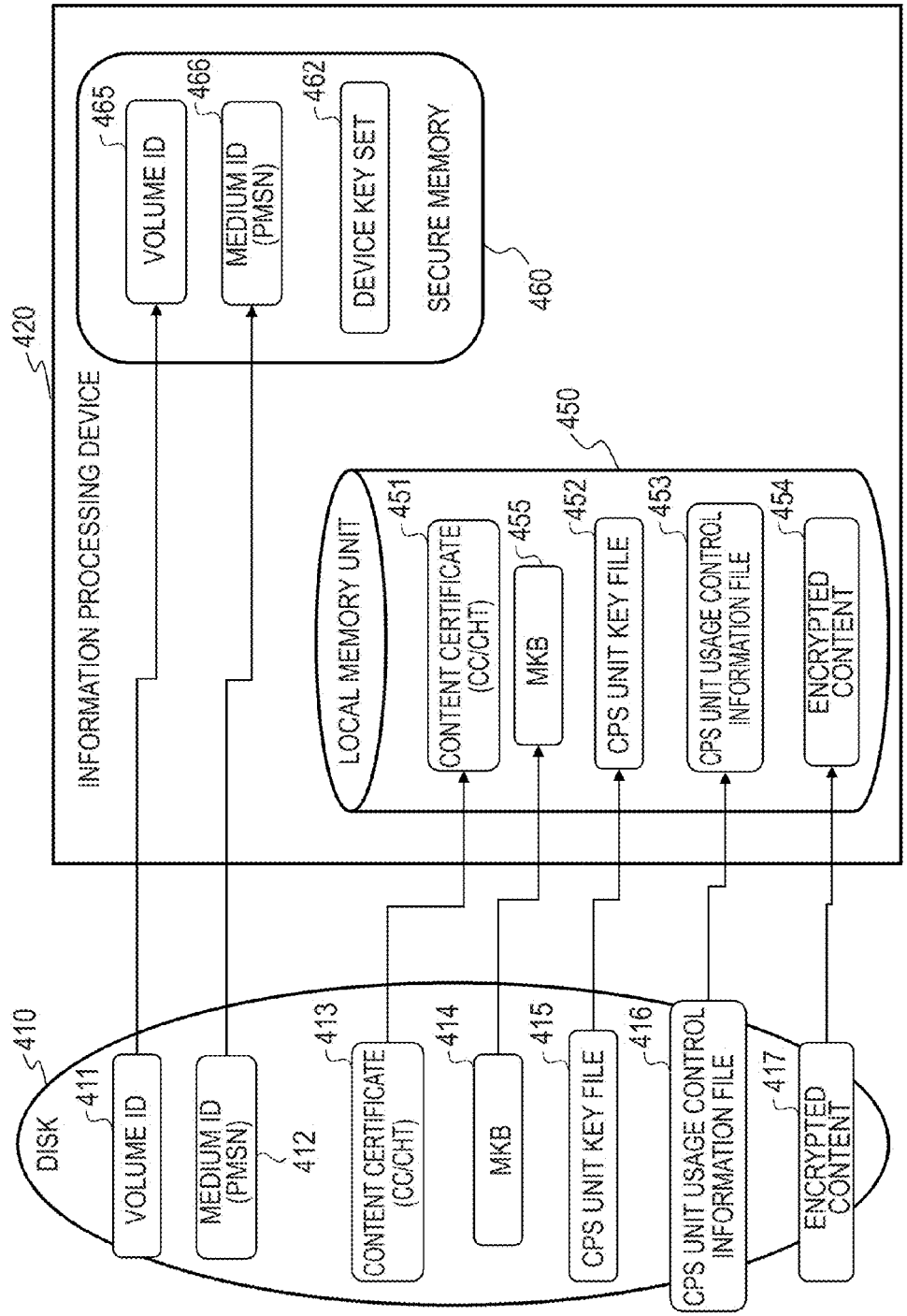
FIG. 10 is a diagram illustrating details of data movement and recording processes performed in the inter-medium content copying process.

Similarly to FIG. 9, FIG. 10 shows the example of data storage (B) where the content copied from another medium is stored in the local memory unit. Similarly to FIG. 9, in FIG. 10, a disk 410 storing an encrypted content 417 to be copied and an information processing device 420 including a local memory unit 450 in which the encrypted content 417 of the disk 410 is copied and stored are shown. The information processing device 420 includes a secure memory 460 as an internal memory.

In the example shown in FIG. 10, a volume ID 465, a medium ID (PMSN) 466, and a device key set 462 are stored in the secure memory 460. In the example described with reference to FIG. 9, the content management data (AACS data) 461 is stored. The content management data (AACS data) 461 is data including the volume ID and the medium ID (PMSN) as described with reference to (b) in FIG. 8 and falsification verifying data or the like is added to the data. In the example shown in FIG. 10, such preparation of the data is not performed, but the volume ID 411 and the medium ID 412 recorded in the disk 410 are stored in the secure memory without any change.

The device key set 462 is recorded in the information processing device 420 in advance. Alternatively, the device key set may be acquired from a server or a medium providing the device key set. However, when the device key set is acquired from the server or the medium, it is necessary to secure the security thereof and to prevent the leakage thereof.

The volume ID 465 and the medium ID 466 stored in the secure memory 460 need to be managed in an system with anti-falsification (integrity required). The device key set 462 needs to be managed in a system requiring secrecy.

When the information processing device 420 copies the content from the disk 410, the following data recorded in the disk 410 are read and recorded in the local memory unit 450 of the information processing device 420: a content certificate 413, an MKB 414, a CPS unit key file 415, a CPS unit usage control information file 416, and an encrypted content 417.

A content certificate 451, an MKB 455, a CPS unit key file 452, a CPS unit usage control information file 453, and an encrypted content 454 are stored in the local memory unit 450 shown in FIG. 10.

The information processing device 420 reads the volume ID 411 and the medium ID (PMSN) 412 from the disk 410 and stores the read data in the secure memory 460.

Unlike the example shown in FIG. 9, in the example shown in FIG. 10, the MKB 451 is stored in the local memory unit 450. At the time of reproducing the encrypted content 454 stored in the local memory unit 450, a process of acquiring the medium key using the device key included in the device key set 462 is performed on the MKB 455. In addition, processes accompanied with the process of confirming the validity of the encrypted content 454 and the decoding process using the data stored in the local memory unit and the secure memory 460 are performed.

Similarly to FIGS. 9 and 10, FIG. 11 shows the example of data storage (B) where the content copied from another medium is stored in the local memory unit. In the example shown in FIG. 11, server authentication information (token) which is copy permission information is acquired from a server 500 and is stored in a local memory unit 550.

In the example shown in FIG. 11, a device key set 561, a device binding ID 562, and a binding nonce 563 are stored in the secure memory 560.

The device key set 561 is a key set established to correspond to the information processing device 520 as a device. That is, the device key set is a key set specific to an information processing device as a device or a set of plural information processing devices. This device key set 561 is used to generate a decoding key at the time of decoding the encrypted content 557 stored in the local memory unit 550. This device key set 561 needs to be managed in a secrecy required system.

The device binding ID 562 is an identifier specific to the information processing device as a device or a set of plural information processing devices. The binding nonce 563 is random number information and is generated and stored in the secure memory 560 by the information processing device 520, for example, at the time of acquiring the server authentication information (token) from the server 500. The device binding ID 562 and the binding nonce 563 are data which should be transmitted to the server in order to acquire the server authentication information (token) from the server 500. The device binding ID 562 and the binding nonce 563 need to be managed in a system with anti-falsification (integrity required).

In this example, three pieces of data of the device key set 561, the device binding ID 562, and the binding nonce 563 are stored in the secure memory 560 other than the local memory unit 550. The device key set 561 or the device binding ID 562 may be stored at the time of manufacturing the information processing device 520, or may be acquired and stored from a server or a medium providing the data. When the data is acquired from the server or the medium, it is necessary to have high security to prevent leakage.

When copying the content from the disk 510 and storing the copied content in the local memory unit 550, the information processing device 520 transmits the device binding ID 562 and the binding nonce 563 stored in the secure memory 560 to the server 500.

In step S221 shown in FIG. 11, the server 500 generates the server authentication information (token) by signing the data with the secret key of the server and transmits the server authentication information to the information processing device 520. The information processing device 520 stores the server authentication information (token) in the local memory unit 550. The server authentication information (token) 551 is shown in FIG. 11.

The server 500 provides a DL (download) content certificate 501, which corresponds to the encrypted content 557 copied from the disk 510 and stored in the local memory unit 550, to the information processing device 520 at the time of providing the server authentication information (token). The content certificate 501 includes data for confirming the validity of the encrypted content 557. The information processing device 520 stores the data received from the server 500 in the local memory unit 550. The server authentication information (token) 551 and the DL content certificate (CC) 552 are shown in the local memory unit 550 of FIG. 11.

The information processing device 520 performs the process of copying the content from the disk 510 after acquiring the data from the server 500. When performing the process of copying the content from the disk 510, the information processing device 520 reads the following data from the disk 510 and records the read data in the local memory unit 550 of the information processing device 520: a content hash table 512, an MKB 513, a CPS unit key file 514, a CPS unit usage control information file 515, and an encrypted content 516.

The data of a content hash table 553, an MKB 554, a CPS unit key file 555, a CPS unit usage control information file 556, and an encrypted content 557 are stored in the local memory unit 550 shown in FIG. 11.

The content hash table is a table storing hash values of constituent data of the encrypted content. The content hash table is used to verify whether the content is valid content that was not falsified at the time of reproducing the content.

At the time of reproducing the encrypted content 557 stored in the local memory unit 550, the process including the process of confirming the validity of the encrypted content 557 and the process of decoding the encrypted content is performed using all the data stored in the local memory unit and the device key set 561 stored in the secure memory 560.

In this example, the data stored in the secure memory 560 includes the following data:

a device key set 561 used to generate a key for decoding the encrypted content; and a device binding ID 562 and a binding nonce 563 used to acquire authentication information from the server, which are stored in the secure memory.

As described with reference to FIGS. 6 to 11, when the download content or the copy content is stored in the local memory unit of the information processing device, the data strongly requiring anti-leakage or anti-falsification measures is stored in the secure memory other than the local memory unit. By using this data storage configuration, it is possible to prevent the content from being used even when the data stored in the local memory unit is copied to leak to another medium, thereby preventing the non-permitted use of content.

The invention has been hitherto described with reference to specific embodiments. However, it is obvious to those skilled in the art that the embodiments can be modified in various forms without departing from the spirit and scope of the invention. That is, the invention has been described exemplarily but these should not be taken as definitive. The spirit and scope of the invention can be understood from the appended claims.

A series of processes described in this specification can be performed by hardware, software, or a combination thereof. When the processes are performed by software, a program including the process sequence can be installed in and executed by a memory of a computer assembled into exclusive hardware. Alternatively, the program can be installed in and executed by a general-purpose computer performing various processes. For example, the program can be recorded in a recording medium in advance. The program cannot only be installed in a computer from a recording medium but may be also received through a network such as a LAN (Local Area Network) and the Internet and installed in a recording medium such as a built-in hard disk.

The various processes described in this specification can be performed consecutively in the described order or may be performed in parallel or individually depending on the processing capability of the device performing the processes or as needed. The system in this specification is a logical set of plural devices and is not limited to a configuration in which the plural devices are disposed in the same chassis.

As described above, according to the above-mentioned embodiments of the invention, in the configuration for storing content downloaded from a server or content copied from a medium in a local memory unit, it is possible to safely store key data with high secrecy in memory other than the local memory unit. Accordingly, for example, even when data stored in the local memory unit is copied and leaks out, it is possible to prevent the non-permitted usage of the contents by preventing the data stored in the memory from being leaked out. In addition, the device-specific ID information and the like stored in the memory is transmitted to the server and the server authentication data is received and stored in the local memory unit. Accordingly, the correlation of the content stored in the local memory unit with the device is reliably carried out.

The present application contains subject matter related to that disclosed in Japanese Priority Patent Application JP 2008-212484 filed in the Japan Patent Office on Aug. 21, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
a local memory unit to store first data and an encrypted content;
a memory, other than the local memory unit, to store second data including key information used to reproduce the encrypted content; and
a data processing unit operable to:
write the first data to the local memory unit;
write the second data to the memory;
write the encrypted content, copied from a recording medium, inserted in the information processing device, to the local memory unit based on copy permission information received from a server;
decode the encrypted content based on a validity authenticating process, using the first data stored in the local memory unit and the second data stored in the memory, when reproducing the encrypted content written to the local memory unit.

2. The information processing device according to claim 1, wherein the data processing unit is further operable to transmit information processing device-specific data stored in the memory to the server, to receive server authentication information in which the transmitted data is signed with a key of the server, and to store the received server authentication information in the local memory unit.

3. The information processing device according to claim 1, wherein the data processing unit is further operable to:
acquire key information using an information processing device-specific device key set stored in the memory on a key block stored in the local memory unit when reproducing the encrypted content written to the local memory unit.

4. The information processing device according to claim 1, wherein the data processing unit is further operable to:
download the encrypted content from the server; and
acquire a volume-unique key correlated with the downloaded content and content management data; and
store the acquired volume-unique key in the memory.

5. The information processing device according to claim 4, wherein the data processing unit is further operable to store the volume-unique key in the memory as data corresponding to a title of the encrypted content.

6. The information processing device according to claim 4, wherein the data processing unit is further operable to store the content management data in the memory as the data corresponding to the title of the encrypted content, a volume ID correlated with the encrypted content, a medium ID specific to the recording medium, and a falsification verification code.

7. The information processing device according to claim 1, wherein the data processing unit is further operable to:
read a volume ID correlated with the encrypted content stored in the recording medium and a medium ID specific to the recording medium; and
write the volume ID and the medium ID to the memory when performing the copying and writing the encrypted content stored in the recording medium to the local memory unit.

8. The information processing device according to claim 1, wherein the data processing unit is further operable to:
acquire key information using a device key set, which is stored in the memory, specific to the information processing device on a key block stored in the recording medium; and
write the acquired key information to the memory, when performing the copying and writing the encrypted content stored in the recording medium to the local memory unit.

9. The information processing device according to claim 1, wherein the data processing unit is further operable to:
transmit information processing device-specific data stored in the memory to the server;
receive server authentication information in which the transmitted data is signed with a secret key of the server;
store the received server authentication information in the local memory unit;
acquire a content certificate from the server for authenticating the validity of the encrypted content; and
store the acquired content certificate in the local memory unit, when performing the copying and writing the encrypted content stored in the recording medium to the local memory unit.

10. A data processing method performed by an information processing device, the method comprising:
writing encrypted content, copied from a recording medium, inserted in the information processing device, to a local memory unit based on copy permission information received from a server;
transmitting information processing device-specific data stored in memory other than the local memory unit to the server;
receiving server authentication information in which the transmitted data is signed with a key of the server; and
storing the received server authentication information in the local memory unit.

11. A non-transitory computer readable medium having stored thereon, a computer program having at least one code section executable by a computer, thereby causing the computer to perform the steps comprising:
writing encrypted content, copied from a recording medium, inserted in an information processing device, to a local memory unit based on copy permission information received from a server;
transmitting information processing device-specific data stored in memory other than the local memory unit to the server;
receiving server authentication information in which the transmitted data is signed with a key of the server; and
storing the received server authentication information in the local memory unit.

12. The information processing device according to claim 1, wherein the local memory unit comprises a hard disk of the information processing device; and the memory, other than the local memory unit, comprises a secure internal memory in which reading or changing of stored data is permitted in only a predetermined sequence.

13. The data processing method according to claim 10, wherein the local memory unit comprises a hard disk of the information processing device; and the memory, other than the local memory unit, comprises a secure internal memory in which reading or changing of stored data is permitted in only a predetermined sequence.

14. The non-transitory computer readable medium according to claim 11, wherein the local memory unit comprises a hard disk of the information processing device; and the memory, other than the local memory unit, comprises a secure internal memory in which reading or changing of stored data is permitted in only a predetermined sequence.

15. The information processing device according to claim 1, wherein the recording medium stores a JAVA® BD-J application, a managed-copy management file (MCMF), and management data.

16. The information processing device according to claim 15, wherein the MCMF comprises an identifier associated with the encrypted content and a uniform resource locator (URL) to access the server.

17. The information processing device according to claim 15, wherein the data processing unit is further operable to:
read the JAVA® BD-J application, the MCMF, and the management data from the recording medium;
access the server based on the read JAVA® BD-J application and the MCMF;
receive the copy permission information from the server;
transform the management data based on the copy permission information and type of the local memory unit; and
write the transformed management data to the local memory unit.

18. The information processing device according to claim 17, wherein the management data comprises one or more of:

a content management unit (CPS) key file, usage control information, a content certificate, and/or a media key block (MKB) as the first data.

19. The information processing device according to claim 18, wherein the CPS key file is used to decode the encrypted content and the MKB comprises an encryption key block to acquire the CPS key file.

20. The information processing device according to claim 18, wherein the content certificate represents the validity of the encrypted content.

* * * * *